(12) United States Patent
Hirakawa et al.

(10) Patent No.: US 9,214,677 B2
(45) Date of Patent: Dec. 15, 2015

(54) LITHIUM ION SECONDARY BATTERY ELECTRODE, MANUFACTURING PROCESS FOR THE SAME, AND LITHIUM ION SECONDARY BATTERY USING THE ELECTRODE

(75) Inventors: Yuichi Hirakawa, Kariya (JP); Manabu Miyoshi, Kariya (JP); Keiichi Hayashi, Kariya (JP); Hitotoshi Murase, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 148 days.

(21) Appl. No.: 14/116,605

(22) PCT Filed: Apr. 19, 2012

(86) PCT No.: PCT/JP2012/002726
§ 371 (c)(1),
(2), (4) Date: Nov. 8, 2013

(87) PCT Pub. No.: WO2012/153469
PCT Pub. Date: Nov. 15, 2012

(65) Prior Publication Data
US 2014/0087252 A1 Mar. 27, 2014

(30) Foreign Application Priority Data
May 12, 2011 (JP) ................. 2011-107060

(51) Int. Cl.
*H01M 4/62* (2006.01)
*H01M 4/04* (2006.01)
(Continued)

(52) U.S. Cl.
CPC ............ *H01M 4/628* (2013.01); *H01M 4/0404* (2013.01); *H01M 4/0471* (2013.01); *H01M 4/139* (2013.01); *H01M 4/366* (2013.01); *H01M 4/62* (2013.01); *Y02E 60/122* (2013.01)

(58) Field of Classification Search
CPC . H01M 4/628; H01M 4/0404; H01M 4/0471; H01M 4/139
See application file for complete search history.

(56) References Cited

U.S. PATENT DOCUMENTS

2006/0008706 A1   1/2006   Yamaguchi et al.
2006/0063073 A1   3/2006   Kawashima et al.
(Continued)

FOREIGN PATENT DOCUMENTS

JP   10-312803 A   11/1998
JP   11-354104 A   12/1999
(Continued)

OTHER PUBLICATIONS

Machine Translation of JP-2011166044.*

*Primary Examiner* — Stewart Fraser
(74) *Attorney, Agent, or Firm* — Sughrue Mion, PLLC

(57) ABSTRACT

To provide a lithium ion secondary battery electrode in which a coat is held on a surface of an active material layer over a long period of time to suppress decomposition of the electrolysis solution and to enhance the cyclability, a manufacturing process for the same, and a lithium ion secondary battery using the electrode.
A lithium ion secondary battery electrode includes a current collector, an active material layer containing a binder formed on a surface of the current collector, and a coat containing modified polydimethylsiloxane formed on a surface of at least a part of the active material layer, wherein the coat is chemically bonded with the binder.

4 Claims, 3 Drawing Sheets

(51) Int. Cl.
*H01M 4/139* (2010.01)
*H01M 4/36* (2006.01)

(56) References Cited

U.S. PATENT DOCUMENTS

| | | |
|---|---|---|
| 2006/0246354 A1 | 11/2006 | Lee et al. |
| 2007/0148543 A1 | 6/2007 | Takamuku et al. |
| 2011/0068001 A1* | 3/2011 | Affinito et al. ............ 204/242 |
| 2011/0159372 A1* | 6/2011 | Zhamu et al. ............ 429/232 |

FOREIGN PATENT DOCUMENTS

| | | | |
|---|---|---|---|
| JP | 2002-008657 | A | 1/2002 |
| JP | 2004-265609 | A | 9/2004 |
| JP | 2006-049266 | A | 2/2006 |
| JP | 2007-173026 | A | 7/2007 |
| JP | 2008-537293 | A | 9/2008 |
| JP | 2009-043678 | A | 2/2009 |
| JP | 2011-070892 | A | 4/2011 |
| JP | 2011-166044 | A | 8/2011 |
| JP | 2011166044 | A * | 8/2011 |

* cited by examiner

LITHIUM ION SECONDARY BATTERY ELECTRODE, MANUFACTURING PROCESS FOR THE SAME, AND LITHIUM ION SECONDARY BATTERY USING THE ELECTRODE

CROSS REFERENCE TO RELATED APPLICATIONS

This is a National Stage of International Application No. PCT/JP2012/002726 filed Apr. 19, 2012, claiming priority based on Japanese Patent Application No. 2011-107060 filed May 12, 2011, the contents of all of which are incorporated herein by reference in their entirety.

TECHNICAL FIELD

The present invention relates to a lithium ion secondary battery electrode, a manufacturing process for the same, and a lithium ion secondary battery using the electrode.

BACKGROUND ART

A lithium ion secondary battery is a secondary battery that has high charging/discharging capacity and that can carry out high output. The lithium ion secondary battery is currently used mainly as a power source for a portable electronic device, and is further expected to be used as a power source for an electric automobile, which is assumed to prevail in the future. The lithium ion secondary battery has, at a positive electrode and a negative electrode, an active material that can insert and desorb lithium (Li). The lithium ion secondary battery operates when the lithium ions move in an electrolysis solution provided between the electrodes.

The lithium ion secondary battery is desired to maintain the discharging capacity even after repeating charging and discharging. However, the charging/discharging cycle lifespan of the lithium ion secondary battery becomes short as the electrode active material and the electrolysis solution gradually react thus decomposing the electrolysis solution.

Various considerations have been made to suppress such decomposition of the electrolysis solution. For example, Patent Literature 1 discloses mixing a chemical compound, which contains polysiloxane, perfluoropolyether, perfluoroalkane, and derivatives thereof, in the electrolysis solution, and forming a coat of the chemical compound on the positive electrode or the negative electrode. Such chemical compounds are chemical compounds that have smaller surface tension than the electrolysis solution and that are insoluble in the electrolysis solution, and thus the coat forms on the electrode in the battery when the battery is assembled. Patent literature 2 discloses covering a lithium ion conductive polymer compound including a polyethylene glycol unit on the active material consisting tin oxide or composite tin oxide.

However, the coat may detach from the electrode as the number of cycles becomes greater in a battery in which the coat is attached to the electrode as described in Patent Literature 1, and it is troublesome to cover the polymer compound on the active material itself as described in Patent Literature 2.
Patent Literature No. 1: Japanese Unexamined Patent Publication (KOKAI) Gazette No. 2004-265609
Patent Literature No. 2: Japanese Unexamined Patent Publication (KOKAI) Gazette No. 10-312803

DISCLOSURE OF THE INVENTION

Assignment to be Solved by the Invention

In view of the current situation of the conventional art, it is a main object of the present invention to form a coat that can be held over a long period of time on a surface of an active material layer, and to provide a lithium ion secondary battery electrode that can suppress the decomposition of the electrolysis solution using the coat and enhance the cyclability of the battery, a manufacturing process for the same, and a lithium ion secondary battery using the electrode.

Means for Solving the Assignment

The present inventors have conducted thorough researches to achieve the object described above. The inventors found as a result that the cyclability of the lithium ion secondary battery can be enhanced by forming the coat containing modified polydimethylsiloxane on at least a part of a surface of the active material layer.

In other words, a lithium ion secondary battery electrode according to the present invention comprises a current collector, an active material layer containing a binder formed on a surface of the current collector, and a coat containing modified polydimethylsiloxane formed on a surface of at least a part of the active material layer, wherein the coat is chemically bonded with the binder.

The coat is preferably formed on the surface of the active material layer by thermally decomposing a polyether chain of the polyether modified polydimethylsiloxane to be chemically bonded with the binder.

In the lithium ion secondary battery according to the present invention, at least one of a positive electrode or a negative electrode is the aforementioned lithium ion secondary battery electrode.

A manufacturing process for a lithium ion secondary battery electrode according to the present invention comprises a slurry making step of mixing an active material, a binder resin, and a polyether modified polydimethylsiloxane to make a slurry; a slurry applying step of applying the slurry on a surface of a current collector; and a heat treatment step of curing the binder resin and thermally decomposing a polyether chain of the polyether modified polydimethylsiloxane to be chemically bonded with the binder resin by heating the slurry applied on the surface of the current collector. The heating temperature in aforementioned heat treatment step is preferably higher than or equal to 160° C.

Effects of the Invention

The lithium ion secondary battery electrode according to the present invention has a coat containing the modified polydimethylsiloxane chemically bonded with the binder formed on a surface of at least a part of the active material layer. With the formation of the coat on the surface of the active material layer, the active material, and the like, which are assumed to decompose the electrolysis solution, can be prevented from directly making contact with the electrolysis solution. The electrolysis solution can be prevented from decomposing due to the active material. Furthermore, the coat is less likely to fall off from the active material layer because the coat is chemically bonded with the binder.

The lithium ion secondary battery including the lithium ion secondary battery electrode described above thus becomes a lithium ion secondary battery having an excellent cyclability.

Figure 1:
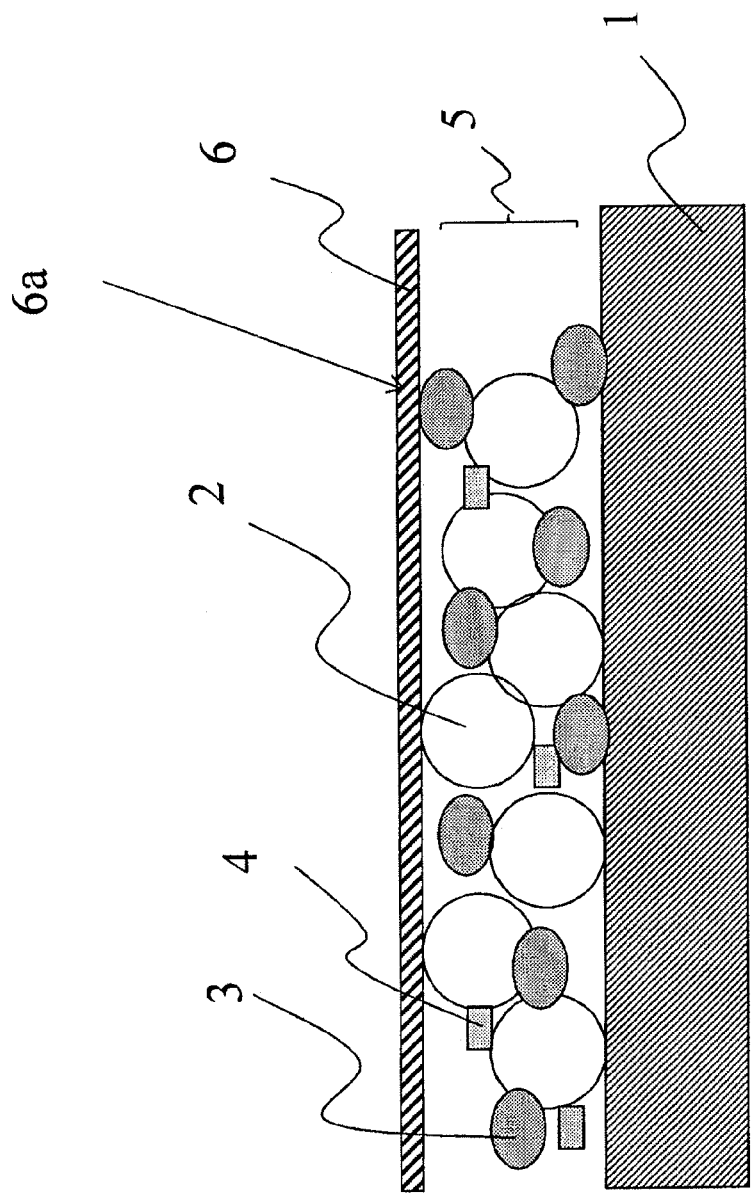
FIG. 1 is a schematic diagram that explains a lithium ion secondary battery electrode of the present embodiment.

EXPLANATION ON REFERENCE NUMERALS 1 current collector,
2 active material,
3 binder,
4 conductive additive,
5 active material layer,
6 coat,
10 electrode assembly,
11 electrode,
12 current collecting foil,
13 active material layer,
14, 17 tab,
15, 18 resin film,
16 counter electrode,
19 separator.

MODES FOR CARRYING OUT THE INVENTION (Lithium Ion Secondary Battery Electrode)

A lithium ion secondary battery electrode according to the present invention is explained using FIG. 1. FIG. 1 is a schematic diagram that explains a lithium ion secondary battery electrode of the present embodiment.

FIG. 1 shows a current collector 1, and an active material layer 5 formed on the current collector 1. In the active material layer 5, the active material 2 and the conductive additive 4 are held on the current collector 1 by way of the binder 3. A coat 6, which is chemically bonded with the binder 3 at an area 6a, is formed on a surface of at least one part of the active material layer 5. FIG. 1 is a schematic diagram, and the size and shape are not accurately illustrated. For example, the coat 6 is illustrated in a plate shape in FIG. 1, but the actual coat 6 is an indeterminate form and is formed to be a thin film form along the surface of the active material layer 5.

Furthermore, the coat 6 is chemically bonded with the binder 3 at the surface of the active material layer 5 and has a film form. The coat 6 covers at least a part of the surface of the active material layer 5. The coat 6 thus also covers the active material 2 at the surface of the active material layer 5. The surface of the active material layer 5 may include a portion that is not partially covered by the coat 6. The entire surface of the active material layer 5 is desirably covered by the coat 6.

As shown in FIG. 1, the coat 6 is formed on the surface of at least a part of the active material layer 5, and the coat 6 is bonded with the binder 3. Because the active material 2 is covered by the coat 6, the active material 2 can be prevented from directly making contact with the electrolysis solution. Thus, the electrolysis solution can be prevented by the coat 6 from decomposing due to the active material 2, and the like contained in the active material layer 5 at the time of charging/discharging of the battery. The coat 6 is less likely to detach from the active material layer 5 even if the battery is repeatedly charged and discharged, and hence the decomposition of the electrolysis solution can be suppressed for a long time.

The lithium ion secondary battery electrode according to the present invention comprises a current collector, an active material layer and a coat, which contains modified polydimethylsiloxane chemically bonded with the binder contained in the active material layer, formed on a surface of at least a part of the active material layer.

The current collector refers to a chemically inactive highly-electron-conductive body for keeping electric current flowing to electrodes during discharging or charging. The current collector may adopt shapes like foil, plate, and the like. The configuration is not limited to above especially as far as it takes the shape corresponding to the purpose. For example, a metal foil such as copper foil, nickel foil, aluminum foil, stainless foil, and the like can be suitably used as the current collector.

The active material layer includes an active material and a binder. The active material layer may include a conductive additive, as needed.

The active material refers to a substance that directly contributes to electrode reactions such as charging reactions and discharging reactions. An appropriate positive electrode active material is lithium containing compound. For example, lithium containing metal composite oxide such as lithium-cobalt composite oxide, lithium-nickel composite oxide, lithium-manganese composite oxide, and the like can be used as the positive electrode active material.

Other metal compounds or polymer materials may also be used as the positive electrode active material. As other metal compounds, for example, oxides such as titanium oxide, vanadium oxide, manganese dioxide, or the like, or disulfides such as titanium sulfide, molybdenum sulfide, or the like are given. As the polymer material, for example, conductive polymer such as polyaniline, polythiophene, or the like, is given.

Carbon based materials that can occlude and release lithium, metals that can be alloyed with lithium, alloy of such metals or compound of such metals, polymer material, and the like can be used for the negative electrode active material.

As the carbon based material, non-graphitizable carbon, artificial graphite, cokes, graphites, glassy carbons, organic polymer compound burnt body, carbon fiber, activated carbon, or carbon black is given. The organic polymer compound burnt body refers to a body in which the polymer material such as phenols and furans are burnt at an appropriate temperature and carbonized.

As the metal that can be alloyed with lithium, Al, Si, Zn, Ge, Cd, Sn, Pb and the like are given. As the alloy or compound of the metal that can be alloyed with lithium, ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), $SnSiO_3$, LiSiO, LiSnO and the like are given.

As the polymer material, polyacetylene, polypyrrole, and the like are given.

The binder is used as a binding agent for fixing the active material and the conductive additive to the current collector. The binder is desired to bind the active material, and the like with as small amount as possible, and the amount of the binder is desirably 0.5% by mass to 50% by mass assuming the total amount of the active material, the conductive additive, and the binder is 100% by mass.

For the binder, for example, cured substance of polyvinylidene fluoride (PVDF), cured substance of fluorine polymer such as polytetrafluoroethylene (PTFE), and the like, cured substance of rubber such as stylene butadiene rubber (SBR), and the like, cured substance of imide based polymer such as polyimide, polyamideimide, and the like, and cured substance of alkoxysilyl group containing resin can be used.

The conductive additive is added to enhance the conductivity of the electrode layer. For the conductive additive, carbon black, graphite, acetylene black (AB), Ketjen black (KB), Vapor Grown Carbon Fiber (VGCF), and the like, which are carbonaceous particulates, can be added alone or in a combination of two or more types. The usage amount of the conductive additive is not particularly limited, and for example, about 20 to 100 parts by mass can be used with respect to 100 parts by mass of active material.

The coat containing modified polydimethylsiloxane is formed on the surface of at least a part of the active material layer. The active material layer contains substances that may possibly decompose the electrolysis solution, for example, the active material and the conductive additive. It is said that the electrolysis solution is decomposed by an active group such as the OH group, and the like at the surface of the active material, for example, under low voltage and reducing atmosphere. Because of covering the surface of the active material layer by the coat containing modified polydimethylsiloxane, the active material or the conductive additive and the electrolysis solution can be prevented from directly making contact with each other. The decomposition of the electrolysis solution can be suppressed as long as the electrolysis solution is not directly brought into contact with the active group at the surface of the active material or the conductive additive that decomposes the electrolysis solution.

The coat needs to be formed on the surface of at least a part of the active material layer. It is desirable that the coat covers the entire surface of the active material layer. When the coat covers the entire surface of the active material layer, the entire active group such as the active material and the like, which is assumed to decompose the electrolysis solution, can be prevented from making contact with the electrolysis solution, and the decomposition of the electrolysis solution can be reliably suppressed.

The modified polydimethylsiloxane in the present invention refers to a modified substance of polydimethylsiloxane having a structure in which a part of a side chain of the polydimethylsiloxane added with the side chain is chemically bonded with the binder. The polydimethylsiloxane, which is basic skeleton, is the main chain and the side chain added to the polydimethylsiloxane is an organic substance added to the methyl group portion. A part of the side chain is chemically bonded with the binder. The chemical bond refers to a chemically bonded state and the chemical bond generally includes types such as ion bond, covalent bond, metal bond, hydrogen bond, and the like. The chemical bond of the coat and the binder is a chemical bond of a part of the side chain (organic substance) added to the polydimethylsiloxane and the binder (organic substance), and thus such chemical bond is mainly covalent bond.

The modified polydimethylsiloxane having the structure described above is insoluble in the organic solvent because the polydimethylsiloxane, which is the basic skeleton, is the main chain, and hence the surface activity of the modified polydimethylsiloxane having the structure described above is high because the polydimethylsiloxane, which is the basic skeleton, is the main chain. The modified polydimethylsiloxane is oriented at the gas-liquid interface at the time of forming the coat and becomes the coat due to its properties. Thus, the modified polydimethylsiloxane forms a thin coat on the surface of the active material layer even with a small amount. The coat containing the modified polydimethylsiloxane is insoluble in organic solvent, and thus also does not dissolve in the electrolysis solution. The coat containing the modified polydimethylsiloxane is chemically bonded with the binder. Because the coat and the binder are chemically bonded, the coat is less likely to be stripped off from the active material layer even if the active material is expanded or contracted due to charging/discharging of the electrode. The effect of suppressing decomposition of the electrolysis solution thus lasts for a long time.

When referring to the coat containing the modified polydimethylsiloxane and the binder being chemically bonded, this specifically means that the reaction group of the binder and the reaction group of aforementioned side chain are chemically bonded. For example, in the case that the coat containing the modified polydimethylsiloxane is the polyether modified polydimethylsiloxane, the polyether chain, which is the side chain, decomposes when heated to higher than or equal to approximately 150° C. The reaction group obtained when the polyether chain is decomposed and the reaction group of the binder resin react, and are chemically bonded. The binder resin used in this case is that which does not decompose at the heating temperature of when the reaction group of the side chain and the reaction group of the binder resin chemically bond with each other.

The polyether modified polydimethylsiloxane that is incompatible with the solvent to be used and is incompatible with the binder resin to be used can be used. The compatibility of the polyether modified polydimethylsiloxane with respect to the solvent to be used and the binder resin to be used can be adjusted according to the type and the number of additions of polyether to add to the side chain. The compatibility of the polyether modified polydimethylsiloxane with respect to the solvent to be used and the binder resin to be used can also be adjusted according to the ratio of the dimethyl group of the polyether modified polydimethylsiloxane and the polyether modified group of the polyether modified polydimethylsiloxane. According to such adjustment, the polyether modified polydimethylsiloxane can be made so as not to be compatible with the solvent to be used and the binder resin to be used.

(Manufacturing Process for Lithium Ion Secondary Battery Electrode)

The manufacturing process for the lithium ion secondary battery electrode according to the present invention includes a slurry making step, a slurry applying step, and a heat treatment step. In the slurry making step, the active material, the binder resin, and the polyether modified polydimethylsiloxane are mixed to make the slurry. The solvent and the conductive additive may be added to the slurry as necessary.

In the slurry applying step, the slurry is applied onto the surface of the current collector. In the heat treatment step, the slurry applied to the surface of the current collector is heated to cure the binder resin and thermally decompose the polyether chain of the polyether modified polydimethylsiloxane to be chemically bonded with the binder resin.

The active material, the binder resin, the polyether modified polydimethylsiloxane, and the conductive additive are similar to those described above. The solvent is not particularly limited. N-methylpyrrolidone (NMP), methanol, methylisobutylketone (MIBK), and the like can be used for the solvent.

When mixing the above materials to make the slurry, a general mixing device such as a planetary mixer, defoaming kneader, ball mill, paint shaker, vibration mill, Raikai mixer, agitator mill, and the like can be used.

The mixing proportion of the polyether modified polydimethylsiloxane with respect to the slurry is preferably such that the polyether modified polydimethylsiloxane is from 0.1% by mass to 0.5% by mass assuming the entire slurry is 100% by mass. With such mixing proportion, a very thin coat containing the modified polydimethylsiloxane can be covered on substantially the entire active material layer.

Because the polyether modified polydimethylsiloxane has high surface activity, the surface tension of the entire slurry can be reduced by containing the polyether modified polydimethylsiloxane in the slurry. Thus, the slurry containing the polyether modified polydimethylsiloxane can be easily applied uniformly onto the surface of the current collector.

For the method for applying the slurry, the applying method generally used when producing the secondary battery electrode, such as a roll coat method, dip coat method, doctor blade method, spray coat method, curtain coat method, and the like can be used. The applied thickness of the slurry applied onto the surface of the current collector is preferably from 10 µm to 20 µm.

The slurry contains the polyether modified polydimethylsiloxane. The polyether modified polydimethylsiloxane is insoluble in the solvent and the binder resin and has high surface activity, and thus is oriented at the gas-liquid interface. Therefore, the polyether modified polydimethylsiloxane is oriented and spread to a film form on the surface of the slurry applied on the current collector.

In the heat treatment step, heating is carried out at a temperature at which the polyether chain of the polyether modified polydimethylsiloxane can be thermally decomposed to chemically bond with the binder resin in accordance with the curing temperature of the binder resin to be used. The thermally decomposing temperature of the polyether chain of the polyether modified polydimethylsiloxane is higher than or equal to approximately 150° C., and thus the heating temperature in the heat treatment step is preferably higher than or equal to 160° C. When the heating temperature is higher than or equal to 160° C., the polyether chain of the polyether modified polydimethylsiloxane can be decomposed to be easily chemically bonded with the binder resin. The heating temperature is also preferably lower than the thermally decomposing temperature of the binder resin to be used.

According to the heat treatment step, the active material layer is formed on the current collector, and the coat containing the modified polydimethylsiloxane is formed on the surface of the active material layer. Furthermore, the coat containing the modified polydimethylsiloxane chemically bonds with the binder.

(Lithium Ion Secondary Battery)

In the lithium ion secondary battery according to the present invention, at least one of the positive electrode and the negative electrode is aforementioned lithium ion secondary battery electrode. When at least one of the positive electrode and the negative electrode is aforementioned lithium ion secondary battery electrode, the decomposition of the electrolysis solution by the active material, and the like of the positive electrode or the negative electrode can be suppressed, and the lithium ion secondary battery can have excellent cyclability. The application for the lithium ion secondary battery according to the present invention is not particularly limited. For the vehicle which is desired long lifespan, enhancing the cyclability is particularly effective.

The lithium ion secondary battery that uses the lithium ion secondary battery electrode described above can use a known battery component other than using the lithium ion secondary battery electrode described above, and can also be manufactured through a known method.

In other words, the lithium ion secondary battery according to the present invention includes a positive electrode, a negative electrode, a separator, and an electrolysis solution as the battery components. In the lithium ion secondary battery according to the present invention, at least one of the positive electrode and the negative electrode is aforementioned lithium ion secondary battery electrode.

The separator separates the positive electrode and the negative electrode, and enables the lithium ions to pass while preventing short-circuit of the current caused by the contact of the electrodes. For example, porous film made of synthetic resin such as polytetrafluoroethylene, polypropylene, polyethylene, or the like, or a porous film made of ceramics can be used as the separator.

The electrolysis solution that can be used for the lithium ion secondary battery can be used as the electrolysis solution. The electrolysis solution includes a solvent and an electrolyte dissolved in the solvent.

For example, a cyclic ester, a chain ester, and an ether can be used as the solvent. As for a cyclic ester, for instance, ethylene carbonate, propylene carbonate, butylene carbonate, γ-butyrolactone, viniylene carbonate, 2-methyl-γ-butyrolactone, acetyl-γ-butyrolactone, γ-valerolactone, and the like can be used. As for a chain ester, for instance, dimethyl carbonate, diethyl carbonate, dibutyl carbonate, dipropyl carbonate, ethyl methyl carbonate, alkyl propionate, dialkyl malonate, alkyl acetate, and the like can be used. As for an ether, for instance, tetrahydrofuran, 2-methyl tetrahydrofuran, 1,4-dioxane, 1,2-dimethoxyethane, 1,2-diethoxyethane, 1,2-dibutoxyethane, and the like can be used.

As for the electrolyte to be dissolved in the electrolysis solution, for instance, lithium salt such as $LiClO_4$, $LiAsF_6$, $LiPF_6$, $LiBF_4$, $LiCF_3SO_3$, $LiN(CF_3SO_2)_2$ can be used.

As for the electrolysis solution, for example, a solution in which lithium salt such as $LiClO_4$, $LiPF_6$, $LiBF_4$, $LiCF_3SO_3$, or the like is dissolved in the solvent such as ethylene carbonate, dimethyl carbonate, propylene carbonate, diethyl carbonate, and the like at a concentration of approximately from 0.5 mol/l to 1.7 mol/l can be used

EXAMPLES

The present invention will be further described in detail below using examples.

The lithium ion secondary battery negative electrode according to the present invention was made in the following manner, and a charging/discharging efficiency test and a cycle test were conducted using an evaluation model battery. A laminate type lithium ion secondary battery having the negative electrode as an evaluation electrode was used in the test.

Making of Evaluation Electrode

Example No. 1

SiO produced by Sigma-Aldrich Co. LLC was prepared as the active material. The alkoxy group containing silane modified polyamideimide resin which was produced by ARAKAWA CHEMICAL INDUSTRIES, LTD.; whose product name was COMPOCERAN; whose product number was H901-2; whose solvent composition was NMP/xylene (or Xyl); which had cured residuals in an amount of 30%; which exhibited a viscosity of 8,000 mPa·s; and which had silica in an amount of 2% by weight in the cured residuals (note herein that the "cured residuals" means solid contents after removing the volatile components by curing the resinous components) was prepared as the binder resin. The MAG artificial graphite produced by Hitachi Chemical Co., Ltd. was prepared as a buffer. The carbonaceous conductive additive, specifically, that in which two or three substances of KB (or Ketjen black) produced by Ketjen Black International Corp., graphite, and the like were mixed, was prepared as the conductive additive. The product name BYK-300 produced by BYK Co. was prepared as the polyether modified polydimethylsiloxane.

The active material, the buffer, the carbonaceous conductive additive, and the binder resin were mixed in the proportion of active material:buffer:carbonaceous conductive additive:binder resin=48:34.4:2.6:15 (% by mass). After adjusting by adding an appropriate amount of NMP as the solvent to the mixture, the polyether modified polydimethylsiloxane was added to obtain the slurry. The added amount of polyether modified polydimethylsiloxane in this case is 0.15% by mass assuming the entire slurry is 100% by mass.

After adjusting the slurry, the slurry was placed on an electrolytic copper foil with 20-μm thickness, and the slurry was applied to a film form on the electrolytic copper foil using the doctor blade. The obtained sheet was dried for 20 minutes at 80° C. to volatilize and remove the NMP, and thereafter, the current collector and the applied material on the current collector were joined together firmly by adhesion by means of a roller pressing machine. This was then punched out to a predetermined shape, and the obtained article was heated for two hours at 200° C. to obtain an electrode having a thickness of about 35 μm. This electrode was labeled as the electrode of Example No. 1.

In the electrode of Example No. 1, the thickness of the coat is estimated to be about 200 nm from the compounding amount of the modified polydimethylsiloxane.

<Making of Laminate Type Battery>

Figure 2:
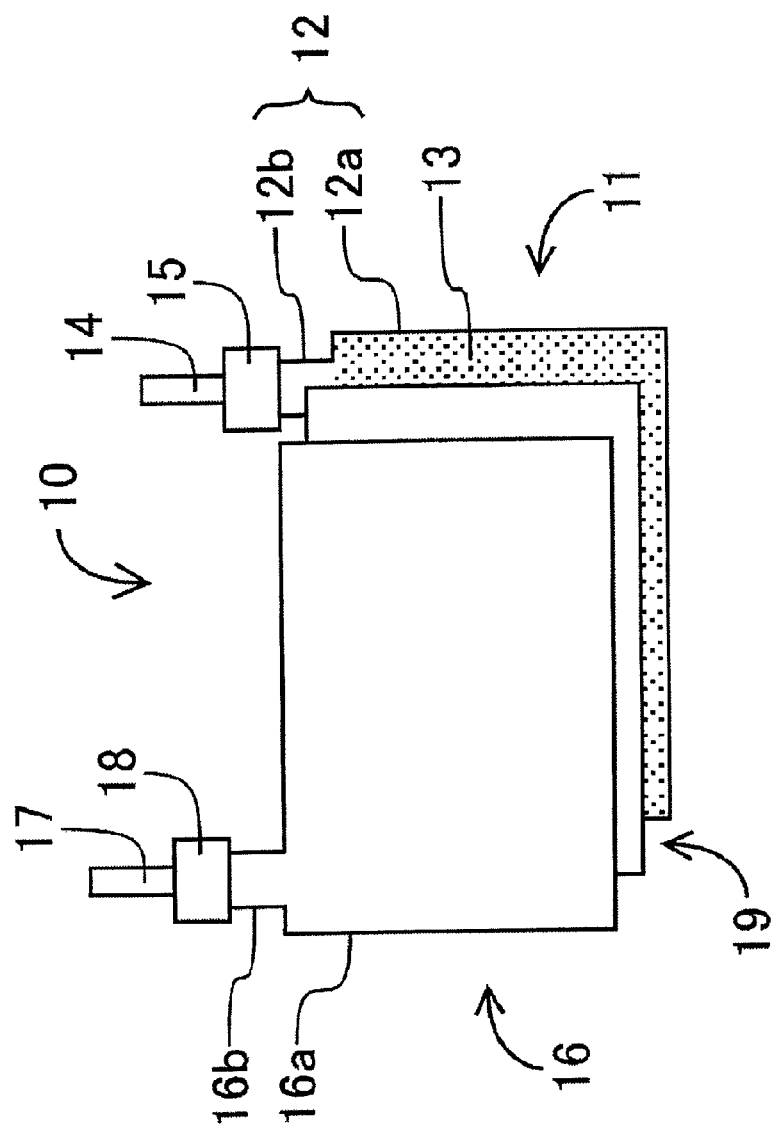
FIG. 2 is an explanatory diagram that illustrates a configuration of an electrode assembly in a laminated battery.

FIG. 2 is an explanatory diagram illustrating a configuration of an electrode assembly of a laminate type battery. The configuration of the laminate type battery will be explained using FIG. 2.

As shown in FIG. 2, the laminate type battery includes a electrode assembly 10 in which an electrode 11, a counter electrode 16, and a separator 19 are stacked, a laminate film (not illustrated) that envelopes and seals the electrode assembly 10, and the electrolysis solution (not illustrated) injected into the laminate film.

The electrode 11 includes a current collecting foil 12, and an active material layer 13 formed on the surface of the current collecting foil 12. The current collecting foil 12 includes an applying portion 12a of a rectangular shape (26 mm×31 mm), and a tab welding portion 12b extending from a corner of the applied portion 12a. The active material layer 13 is formed on one surface of the applying portion 12a. A tab 14 made of nickel is resistance welded to the tab welding portion 12b of the current collecting foil 12. Furthermore, a resin film 15 is attached to the tab welding portion 12b.

Similar to the electrode 11, the counter electrode 16 includes an applying portion 16a of a rectangular shape (25 mm×30 ram), and a tab welding portion 16b extending from a corner of the applying portion 16a. An active material layer (not illustrated) is formed on one surface of the applying portion 16a. A tab 17 made of aluminum is resistance welded to the tab welding portion 16b. Furthermore, a resin film 18 is attached to the tab welding portion 16b.

A rectangular sheet (27 mm×32 mm, thickness 25 μm) is used as the separator 19. The negative electrode active material layer and the positive electrode active material layer are stacked to face each other by way of the separator 19 in the order of the applying portion 12a of the electrode 11, the separator 19, and the applying portion 16a of the counter electrode 16 to configure the electrode assembly 10.

The electrode assembly 10 is covered with a pair of laminate films and the three sides are sealed, and thereafter, a predetermined electrolysis solution is injected into the bag-shaped laminate film. Subsequently, the remaining one side is sealed to air-tightly seal the four sides, whereby the laminate type battery in which the electrode assembly 10 and the electrolysis solution are sealed is obtained. One part of the tabs 14 and 17 of both electrodes are extended to the outer side to electrically connect with the exterior.

The laminate type battery was made according to the configuration of the laminate type battery explained using FIG. 2 above. As for the negative electrode, the electrode of Example No. 1 was used.

The following electrode was made as the positive electrode. An aluminum foil with 20 μm in thickness was used as the current collector, $LiNi_{1/3}Co_{1/3}Mn_{1/3}O_2$ was used as the positive electrode active material, acetylene black was used as the conductive additive, and the polyvinylidene fluoride (PVDF) was used as the binder resin. The active material, the conductive additive, and the binder resin were mixed in the proportion of $LiNi_{1/3}Co_{1/3}Mn_{1/3}O_2$:acetylene black:polyvinylidene fluoride (PVDF)=88:6:6 (% by mass). An appropriate amount of NMP was added as solvent to the mixture and adjusted to obtain the slurry. The slurry was placed on the aluminum foil having a thickness of 20 μm, and the slurry was applied to a film form on the aluminum foil using the doctor blade. The obtained sheet was dried for 30 minutes at 80° C. to volatilize and remove the NMP, and thereafter, the current collector and the applied material on the current collector were pressed by the roll press machine so that the thickness of the applied material becomes 50 μm, that is, the total thickness of the electrode becomes 70 μm. This was punched out to a predetermined shape similar to the negative electrode, and the obtained article was heated in vacuum for six hours at 120° C. to obtain the positive electrode. The electrode density of the positive electrode was 2.37 g/cm$^3$.

The solution in which one mol of $LiPF_6$ is dissolved in the solvent in which ethylene carbonate (EC) and diethyl carbonate (DEC) are mixed at EC:DEC=3:7 (volume ratio) was used as the electrolysis solution. The separator made of polypropylene resin was used as the separator.

Comparative Example No. 1

Other than that the polyether modified polydimethylsiloxane is not added to the slurry, the electrode of Comparative Example No. 1 was made in the same manner as Example No. 1, and the laminate type battery using the electrode of Comparative Example No. 1 was made in the same manner as Example No. 1.

<Evaluation of Laminate Type Battery>

The evaluation of an evaluation electrode in the laminate type battery was conducted with the following methods.

(Charging/Discharging Test)

The charging/discharging test of the battery in which the electrode of Example No. 1 is assumed as the evaluation electrode and the battery in which the electrode of Comparative Example No. 1 is assumed as the evaluation electrode was conducted. In the charging/discharging test, the load test (6 cycles) and the cycle test (100 cycles) were combined.

The load test was conducted two times that are six cycles from the first cycle and another six cycles from the 107th cycle. In the load test, the charging was performed with CCCV charging (constant current constant voltage charging) of 0.2 C, and the discharging was performed with CC discharging (constant current discharging) of 0.2 C, 1 C, 2 C, 3 C, 4 C, 5 C in order from the first cycle. In this case, the current that discharges the electric capacity in one hour is expressed as 10, and the current that discharges the electric capacity in five hours is expressed as 0.2 C. Therefore, the current value of 1 C is five times the current value of 0.2 C.

The cycle test was performed at the constant current 1 C from the 7th cycle after the first load test up to 106th cycle, and then performed up to 200th cycle at the constant current 1 C continuously after performing the second load test.

Each discharging capacity maintenance rate was calculated taking the discharging capacity of charging/discharging performed at the initial constant current 1 C as the basis. The cycle test was performed at 45° C. for the acceleration test. The discharging capacity maintenance rate (%) was obtained with the following equation.

Discharging capacity maintenance rate(%)=(discharging capacity of each cycle/discharging capacity of 7th cycle performed at discharging rate 1 C)×100

Figure 3:
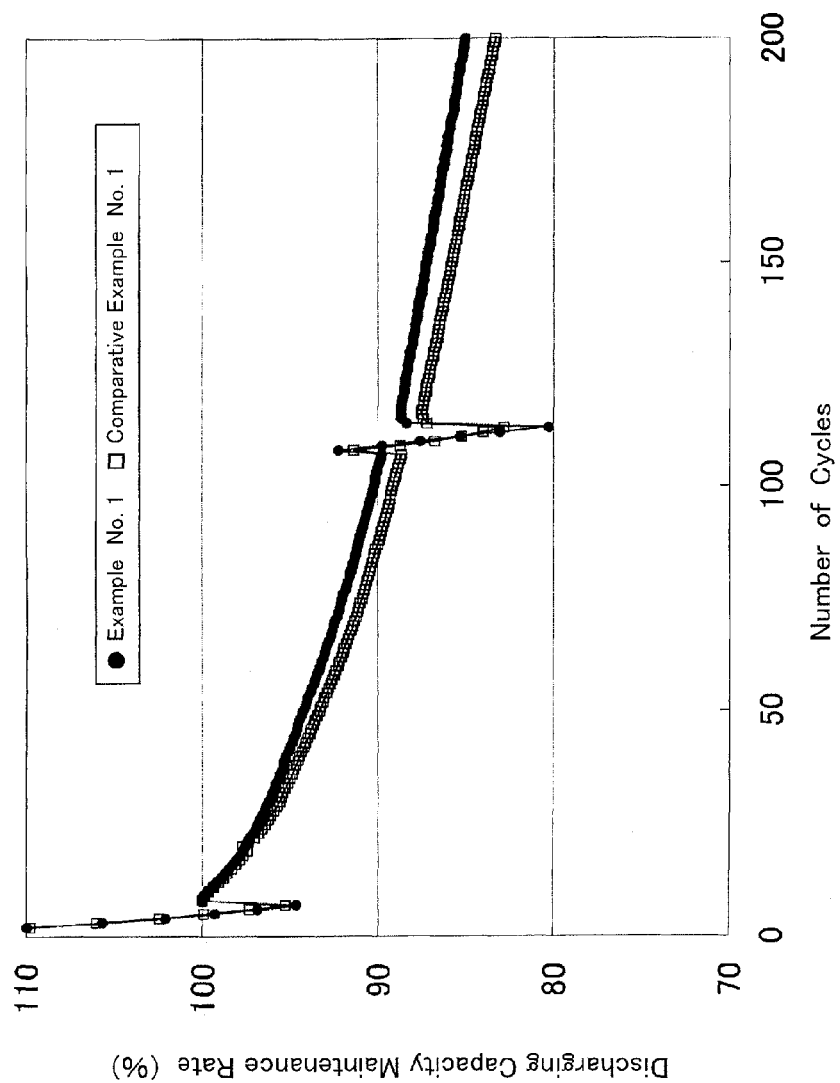
FIG. 3 is a graph that shows the number of cycles and a discharging capacity maintenance rate for a model battery of Example No. 1 and that of Comparative Example No. 1.

With respect to the laminate type battery including the electrode of Example No. 1 and the laminate type battery including the electrode of Comparative Example No. 1, a graph showing the relationship of the number of cycles and discharging capacity maintenance rate (%) is shown in FIG. 3. As apparent from FIG. 3, first in the battery in which the electrode of Example No. 1 is assumed as the evaluation electrode, the lowering rate of the discharging capacity was small in each cycle compared to the battery in which the electrode of Comparative Example No. 1 is assumed as the evaluation electrode. The discharging capacity maintenance rate after 200 cycles was found to be about 83% in the battery in which the electrode of Comparative Example No. 1 is assumed as the evaluation electrode, whereas the discharging capacity maintenance rate after 200 cycles was found to be about 85% in the battery in which the electrode of Example No. 1 is assumed as the evaluation electrode.

That is, according to the results of the cycle test, the battery in which the electrode of Example No. 1 is assumed as the evaluation electrode was found to be better in cyclability compared to the battery in which the electrode of Comparative Example No. 1 is assumed as the evaluation electrode. This may be because the decomposition of the electrolysis solution is suppressed by the coat containing the modified polydimethylsiloxane.

Furthermore, according to the results of the second load test, the battery in which the electrode of Example No. 1 is assumed as the evaluation electrode has high discharging capacity maintenance rate compared to the battery in which the electrode of Comparative Example No. 1 is assumed as the evaluation electrode up to the discharging rate of 3 C. Therefore, it is found that the effect of suppressing the decomposition of the electrolysis solution can be exhibited by the coat containing the modified polydimethylsiloxane even at the time of rapid charging/discharging at the discharging rate of 3 C.

A case in which the coat is formed on the negative electrode has been described in the example, but similar effects can be obtained even if the coat is formed on the positive electrode.

The invention claimed is:

1. A lithium ion secondary battery electrode comprising:
   a current collector;
   an active material layer containing a binder formed on a surface of the current collector; and
   a coat containing a modified polydimethylsiloxane formed on a surface of at least a part of the active material layer, wherein
   said coat is chemically bonded with the binder, and
   said modified polydimethylsiloxane is formed by thermally decomposing a polyether chain of a polyether modified polydimethylsiloxane.

2. The lithium ion secondary battery, wherein at least one of a positive electrode and a negative electrode is the lithium ion secondary battery electrode according to claim 1.

3. A manufacturing process for a lithium ion secondary battery electrode comprising:
   a slurry making step of mixing an active material, a binder resin, and polyether modified polydimethylsiloxane to make a slurry;
   a slurry applying step of applying the slurry on a surface of a current collector; and
   a heat treatment step of curing the binder resin and thermally decomposing a polyether chain of the polyether modified polydimethylsiloxane to be chemically bonded with the binder resin by heating the slurry applied on the surface of the current collector.

4. The manufacturing process for the lithium ion secondary battery electrode as set forth in claim 3, wherein a heating temperature in the heat treatment step is higher than or equal to 160° C.

* * * * *